US007784223B1

(12) United States Patent  
Ramey

(10) Patent No.: US 7,784,223 B1
(45) Date of Patent: Aug. 31, 2010

(54) THREE HUNDRED MILE PER HOUR WIND RESISTIVE BUILDING

(76) Inventor: Larry E. Ramey, Suite 116-333, 5600 W. Lovers La., Dallas, TX (US) 75209

( * ) Notice: Subject to any disclaimer, the term of this patent is extended or adjusted under 35 U.S.C. 154(b) by 987 days.

(21) Appl. No.: 10/795,213

(22) Filed: Mar. 5, 2004

Related U.S. Application Data

(63) Continuation-in-part of application No. 09/870,363, filed on May 30, 2001, now abandoned.

(60) Provisional application No. 60/208,210, filed on May 31, 2000.

(51) Int. Cl.
*E04H 3/00* (2006.01)

(52) U.S. Cl. ........................ 52/79.1; 52/582.1

(58) Field of Classification Search ............... 52/79.1, 52/79.9, 271, 578, 582.1, 745.13, 741.1
See application file for complete search history.

(56) References Cited

U.S. PATENT DOCUMENTS

| | | | |
|---|---|---|---|
| 2,053,873 A | 9/1936 | Wilson | 52/213 |
| 2,143,288 A * | 1/1939 | Stolz | 52/293.1 |
| 2,272,910 A * | 2/1942 | Gobberdiel | 52/262 |
| 2,592,634 A | 4/1952 | Wilson | 52/584.1 |
| 2,969,619 A | 1/1961 | Didrick | 52/601 |
| 3,119,448 A | 1/1964 | Rhoades | 166/12 |
| 3,604,174 A | 9/1971 | Nelson, Jr. | 52/601 |
| 3,706,168 A | 12/1972 | Pilish | 52/234 |
| 3,775,928 A | 12/1973 | Dawson et al | 52/745.13 |
| 3,979,863 A | 9/1976 | Hurley et al. | 52/92 |
| 4,226,061 A | 10/1980 | Day, Jr. | 52/122 |
| 4,472,919 A | 9/1984 | Nourse | 52/601 |
| 4,583,336 A | 4/1986 | Shelangoskie et al. | 52/250 |
| 4,807,407 A | 2/1989 | Horn | 52/79.1 |
| 5,048,243 A | 9/1991 | Ward | 52/167 R |
| 5,131,201 A * | 7/1992 | Larson et al. | 52/583.1 |
| 5,286,427 A | 2/1994 | Koumal | 106/122 |
| 5,359,816 A * | 11/1994 | Iacouides | 52/274 |
| 5,428,926 A | 7/1995 | Melfi | 52/71 |
| 5,473,849 A | 12/1995 | Jones, Jr. et al. | 52/424 |
| 5,487,241 A | 1/1996 | Gorrell et al. | 52/79.1 |
| 5,590,493 A * | 1/1997 | Wilson | 52/108 |
| 5,640,824 A | 6/1997 | Johnson et al. | 52/731.1 |
| 5,758,463 A | 6/1998 | Mancini, Jr. | 52/309.12 |
| 5,761,863 A * | 6/1998 | Sutt et al. | 52/272 |
| 5,826,379 A | 10/1998 | Curry | 52/79.1 |
| 5,881,519 A | 3/1999 | Newkirk | 52/274 |
| 5,974,762 A | 11/1999 | Rodgers | 52/742.14 |
| 6,085,469 A | 7/2000 | Wolfe | 52/71 |

(Continued)

FOREIGN PATENT DOCUMENTS

CA 510456 A 3/1955

(Continued)

*Primary Examiner*—David Dunn
*Assistant Examiner*—Daniel Kenny
(74) *Attorney, Agent, or Firm*—Law Office of William Gustavson, PC

(57) ABSTRACT

A three hundred mile per hour wind resistive building (10) is disclosed. The building includes wall panels (12), roof panels (14) and floor and foundation panels (16) formed of autoclaved cellular concrete. The panels are secured together by angle iron or steel strapping (18) and bolts which bolt the angle iron or strapping directly between abutting panel portions.

16 Claims, 13 Drawing Sheets

U.S. PATENT DOCUMENTS

| | | | |
|---|---|---|---|
| 6,119,417 A | 9/2000 | Valverde et al. | 52/223.7 |
| 6,151,844 A | 11/2000 | Kovachevich | 52/167.1 |
| 6,298,619 B1 | 10/2001 | Davie | 52/220.7 |
| 6,460,302 B1 * | 10/2002 | Neuhaus et al. | 52/261 |
| 6,532,710 B2 | 3/2003 | Terry | 52/561 |

FOREIGN PATENT DOCUMENTS

| | | |
|---|---|---|
| DE | 662022 | 6/1938 |
| GB | 1002302 A | 8/1965 |
| GB | 2049781 | 12/1980 |
| WO | WO 97/37090 | 10/1997 |
| WO | WO 97/40239 | 10/1997 |
| WO | WO 98/10153 | 3/1998 |

* cited by examiner

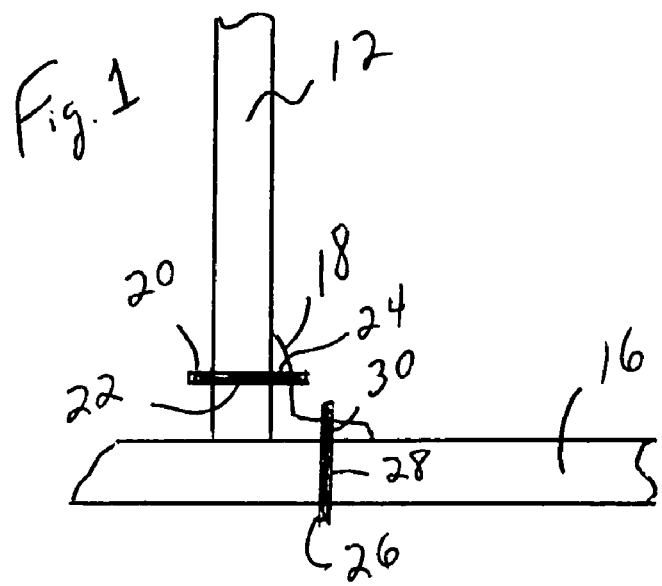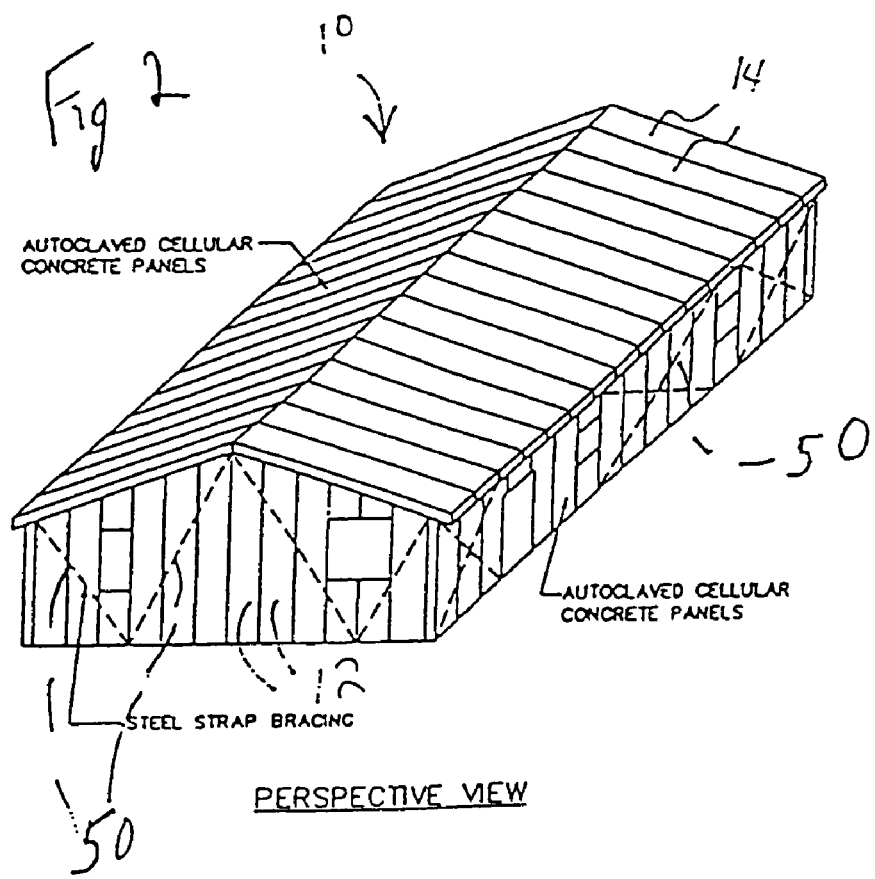

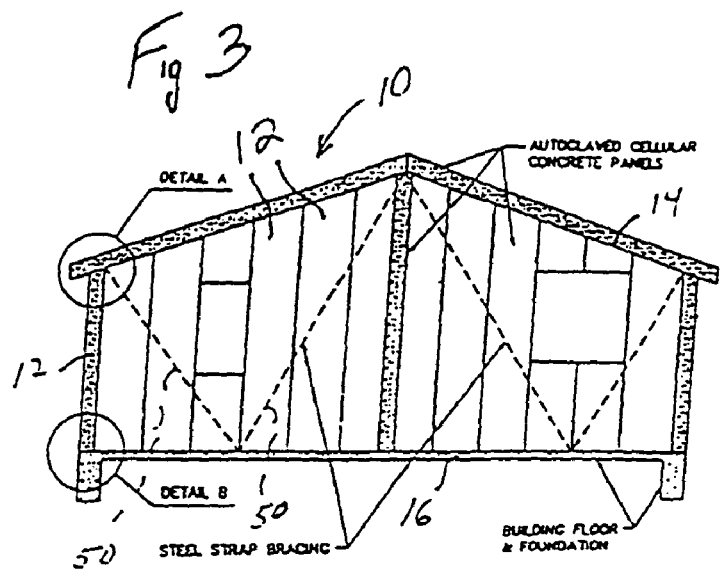
BUILDING SECTION
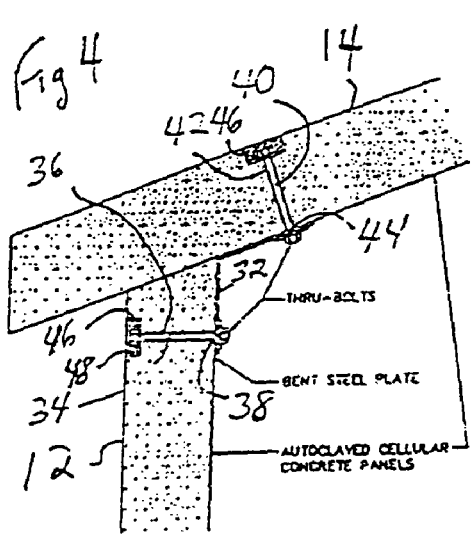
DETAIL A
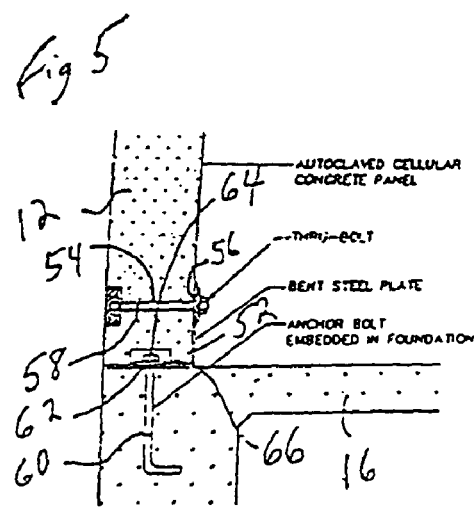
DETAIL B

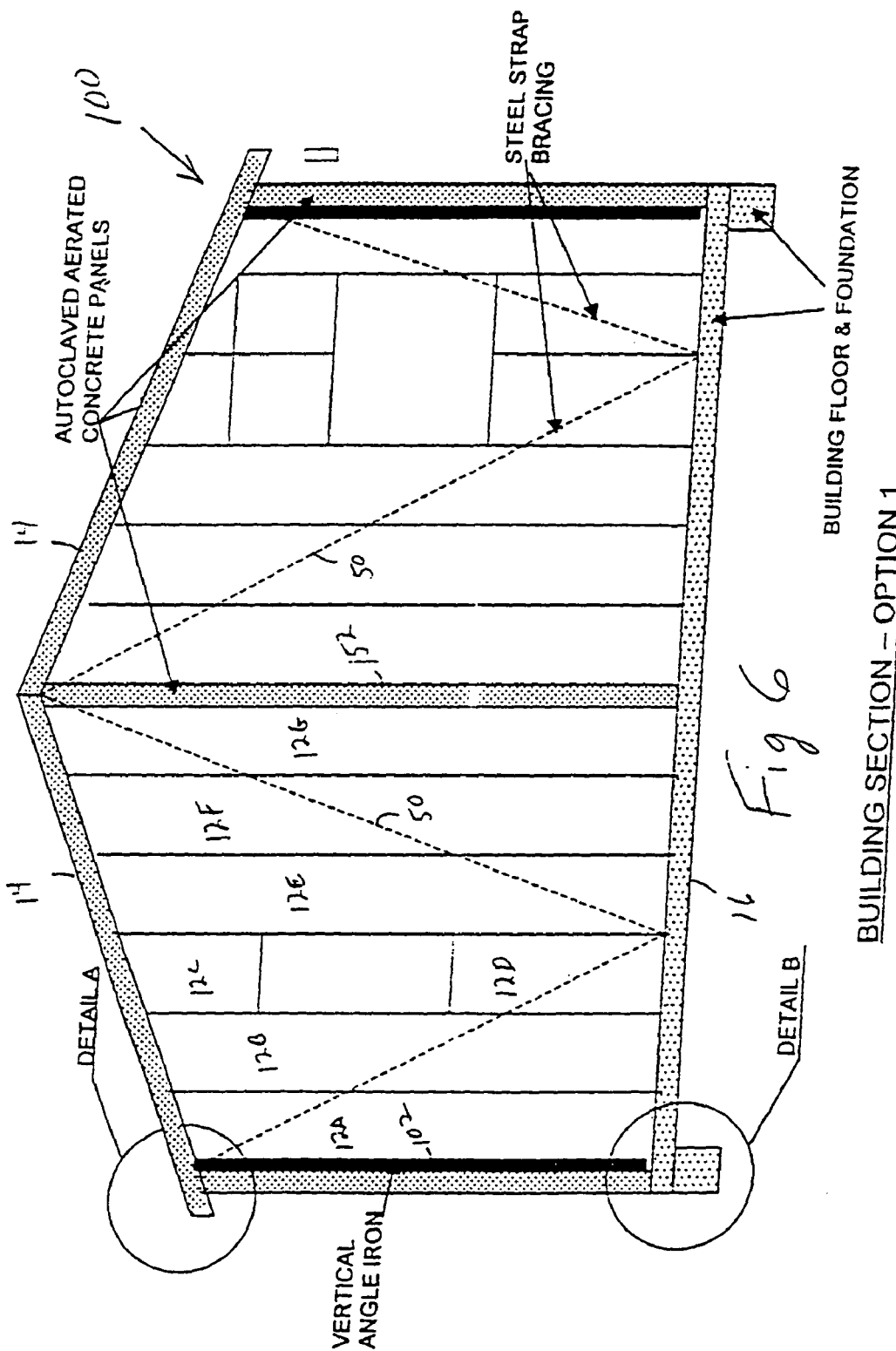

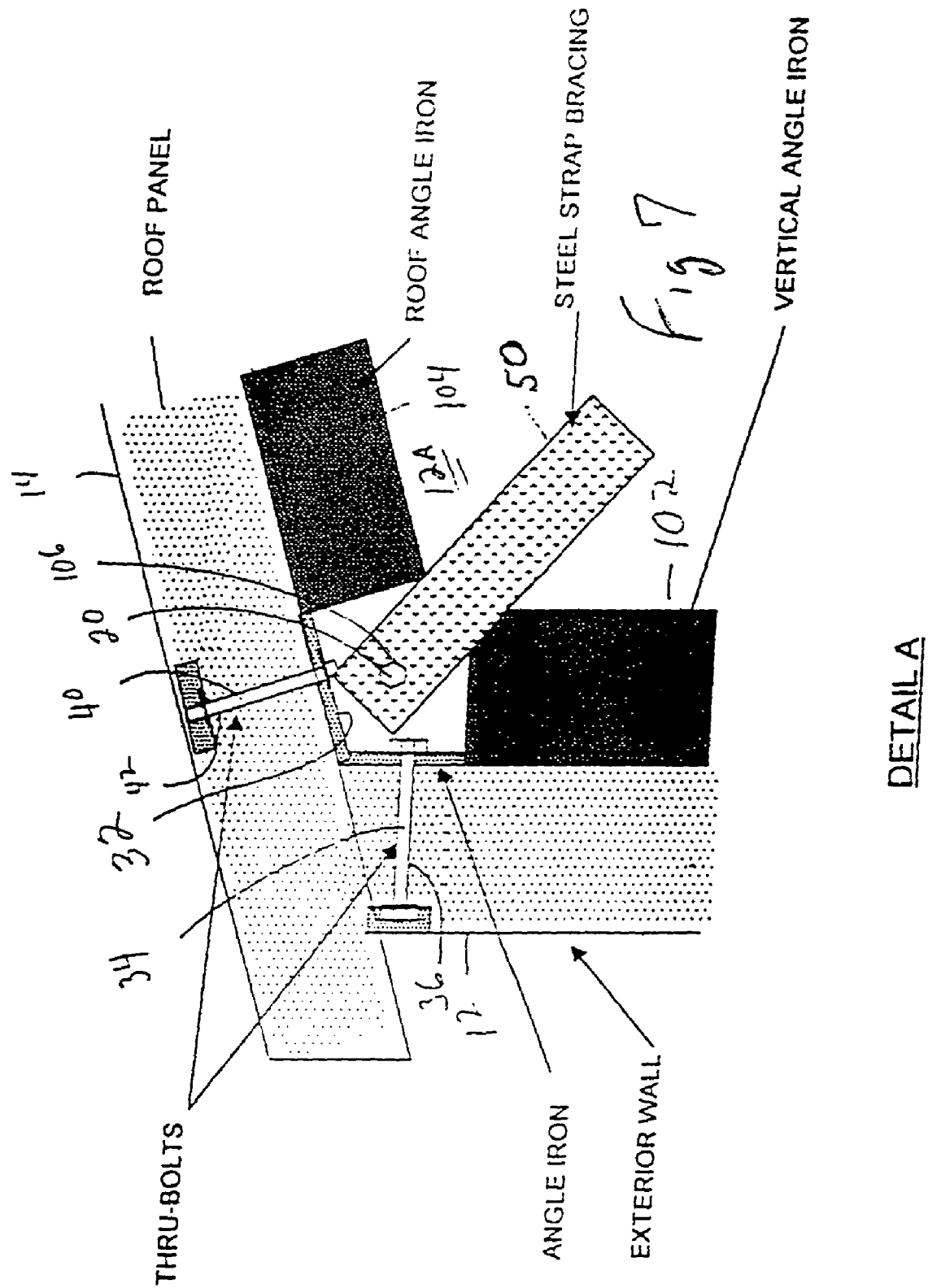

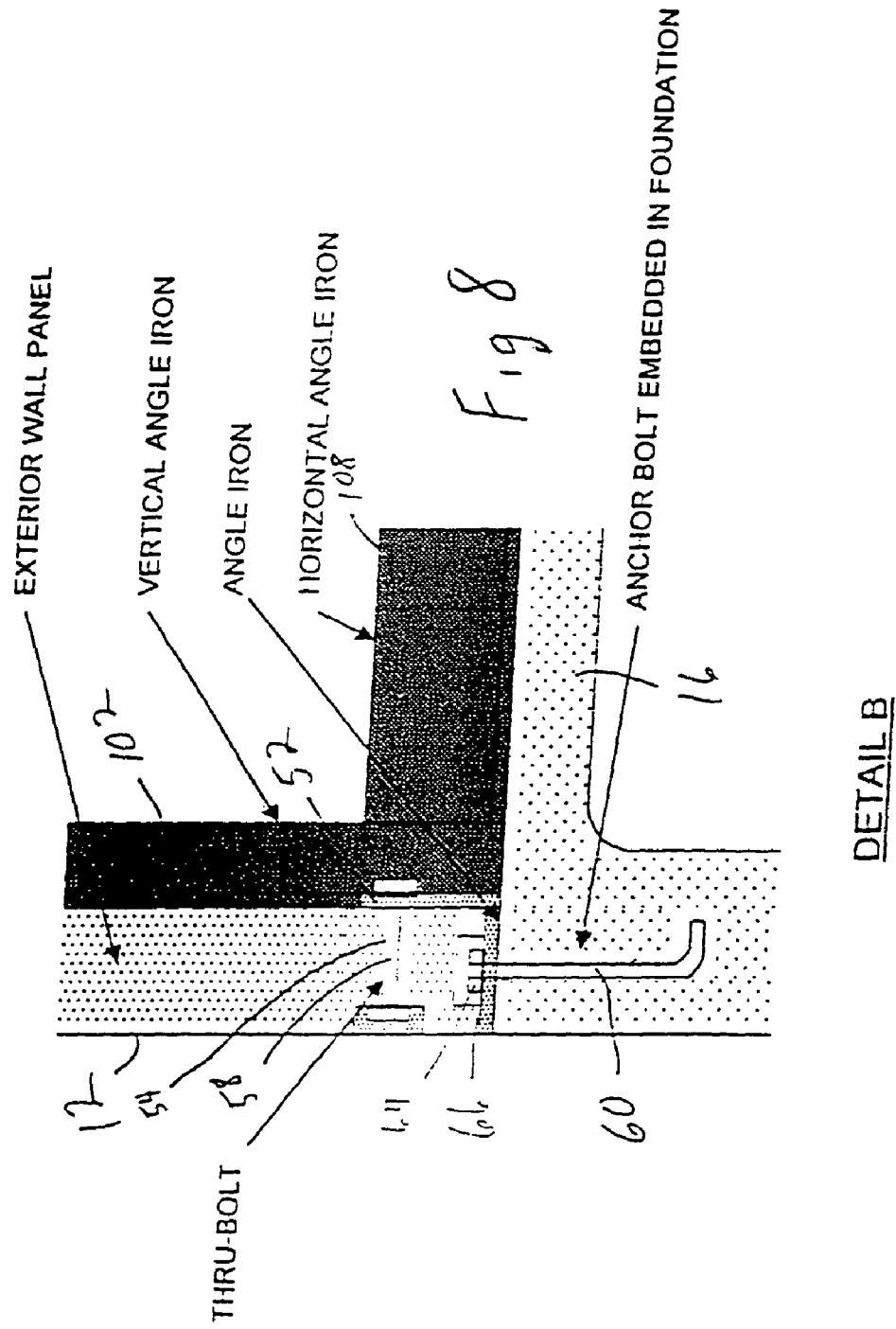

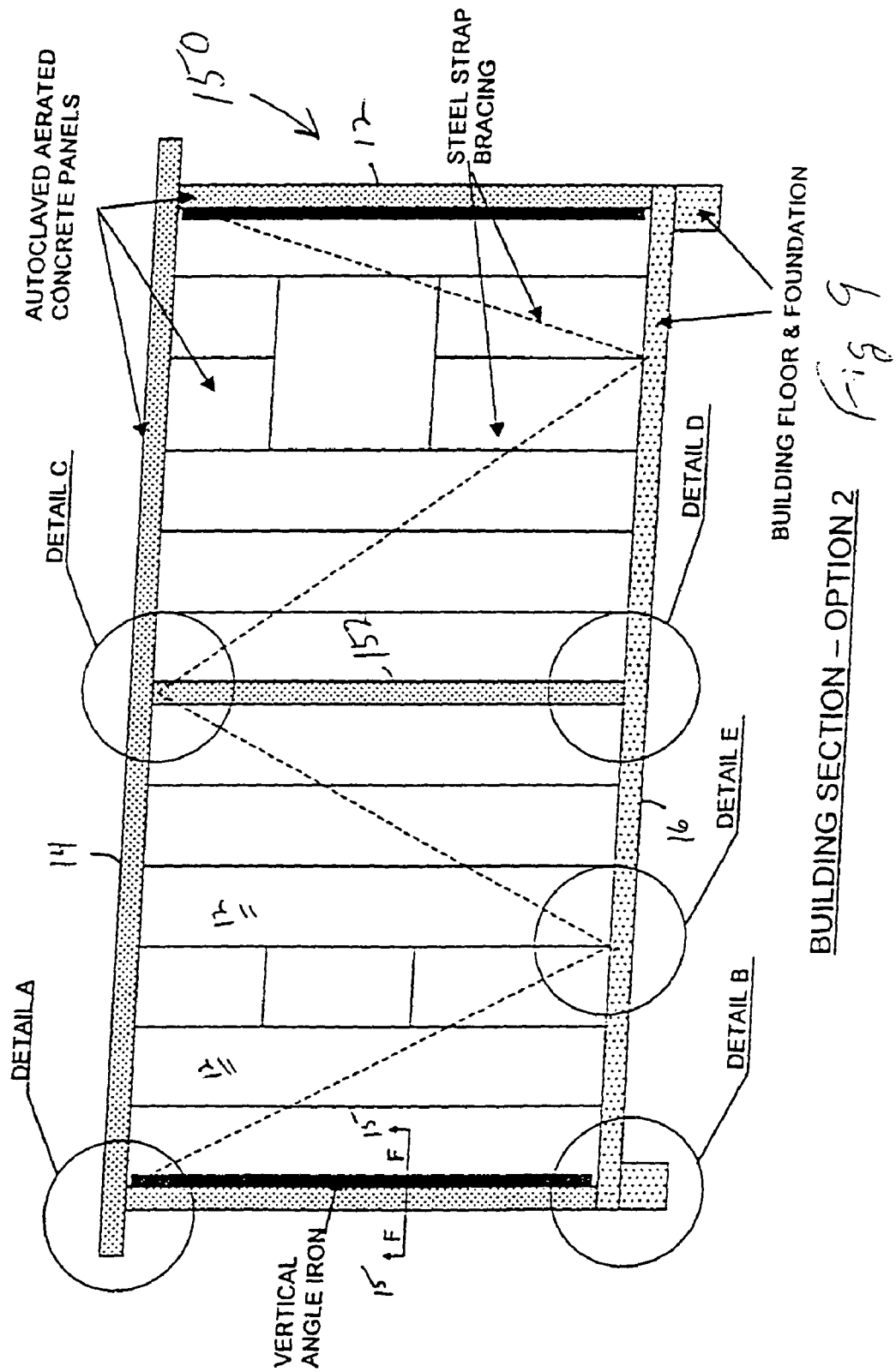

DETAIL A

DETAIL C

CROSS SECTION OF PANEL SHOWING STANDARD REBAR POSITIONS AND SPACINGS

THREE HUNDRED MILE PER HOUR WIND RESISTIVE BUILDING

CROSS REFERENCE TO RELATED APPLICATIONS

This application is a Continuation-in-Part of U.S. patent application Ser. No. 09/870,363 filed May 30, 2001 now abandoned, which claims priority from Provisional Patent Application Ser. No. 60/208,210 filed May 31, 2000.

TECHNICAL FIELD OF THE INVENTION

This invention relates to the construction of buildings to resist high wind pressures.

BACKGROUND OF THE INVENTION

In recent years, the devastating loss of lives and property from tornadoes and hurricanes has reached crisis proportions. Certain areas of the country, such as Florida, are viewed by insurance companies as only being insurable at very high rates because of the magnitude of damage that can be caused by a hurricane. There is a clear need for technology which can reduce this damage to a manageable level to permit insurance companies to provide reasonably priced coverage for structures in such high risk areas.

More recent events such as Hurricane Isabel and the fires in California have reinforced this need for a better quality of construction to allow for a reduction in costs to our Federal Government for monies allocated to FEMA for help in catastrophic events. All taxpayers pay these enormous costs. A higher quality of life for people living in dangerous areas of our country where fear of natural catastrophes is part of their lives is urgently needed.

This patent also can be used by our military services to provide a fast, safe and completely demountable building for use in housing and essential services such as hospitals, warehouses and offices. For example, there are autoclaved cellular concrete plants in Kuwait and Saudi Arabia which could supply Iraq. Small buildings using this patent could be built throughout the Caribbean for housing of essential equipment to provide faster and more complete data to the U.S. Weather Service; in addition, the building could also be built in fire prone areas, allowing firefighters to obtain pertinent information such as fire temperature and wind data.

Knowledgeable people tell me that a slow moving hurricane category 4 (131-151 MPH) striking either the Florida Keys or Galveston could result in at least 10,000 deaths. I hope and pray these occurrences never happen, but hurricane experts will tell you this is very possible.

SUMMARY OF THE INVENTION

In accordance with one aspect of the present invention, a building is contemplated which includes a plurality of autoclaved aerated concrete panels or blocks forming the shape of the building. The panels or blocks are secured together by angle iron or steel strapping bolted between joining panels or blocks by bolts bolted through the panels or blocks themselves.

In the preferred embodiment, a number of angle iron or steel straps run the full length of the building to provide greater rigidity.

This construction creates a building that can withstand a minimum of 300 miles per hour sustained winds, which is in excess of hurricane 5 storm ratings and the maximum sustained wind of the most severe tornado.

BRIEF DESCRIPTION OF THE DRAWINGS

For a more complete understanding of the present invention and for further advantages thereof, reference is now made to the following description of the preferred embodiment, taken in conjunction with the accompanying drawings, in which:

FIG. 1 is an illustrative view of the wall and floor of a building formed in accordance with the teachings of the present invention bolted together through an angle iron or steel strap by bolts;

FIG. 2 is a perspective view of a building formed in accordance with the teachings of the present invention capable of wind resistance to 300 mile per hour winds;

FIG. 3 is an end view of the building of FIG. 2;

FIG. 4 is a detailed view of the fastening between the roof panels and wall panels of the building of FIG. 3;

FIG. 5 is a detailed view of the attachment between the wall panel and the floor panel of the building of FIG. 3;

FIG. 6 is an end view of a building forming a first modification of the building of FIG. 2;

FIG. 7 is a detailed view of the fastening between the roof panels and wall panels of the building of FIG. 6;

FIG. 8 is a detailed view of the attachment between the wall panel and the floor panel of the building of FIG. 6;

FIG. 9 is a side view of a building forming a second modification of the building of FIG. 2 which can have a flat roof or be the first floor of a multistory structure;

DETAILED DESCRIPTION

Figure 10:
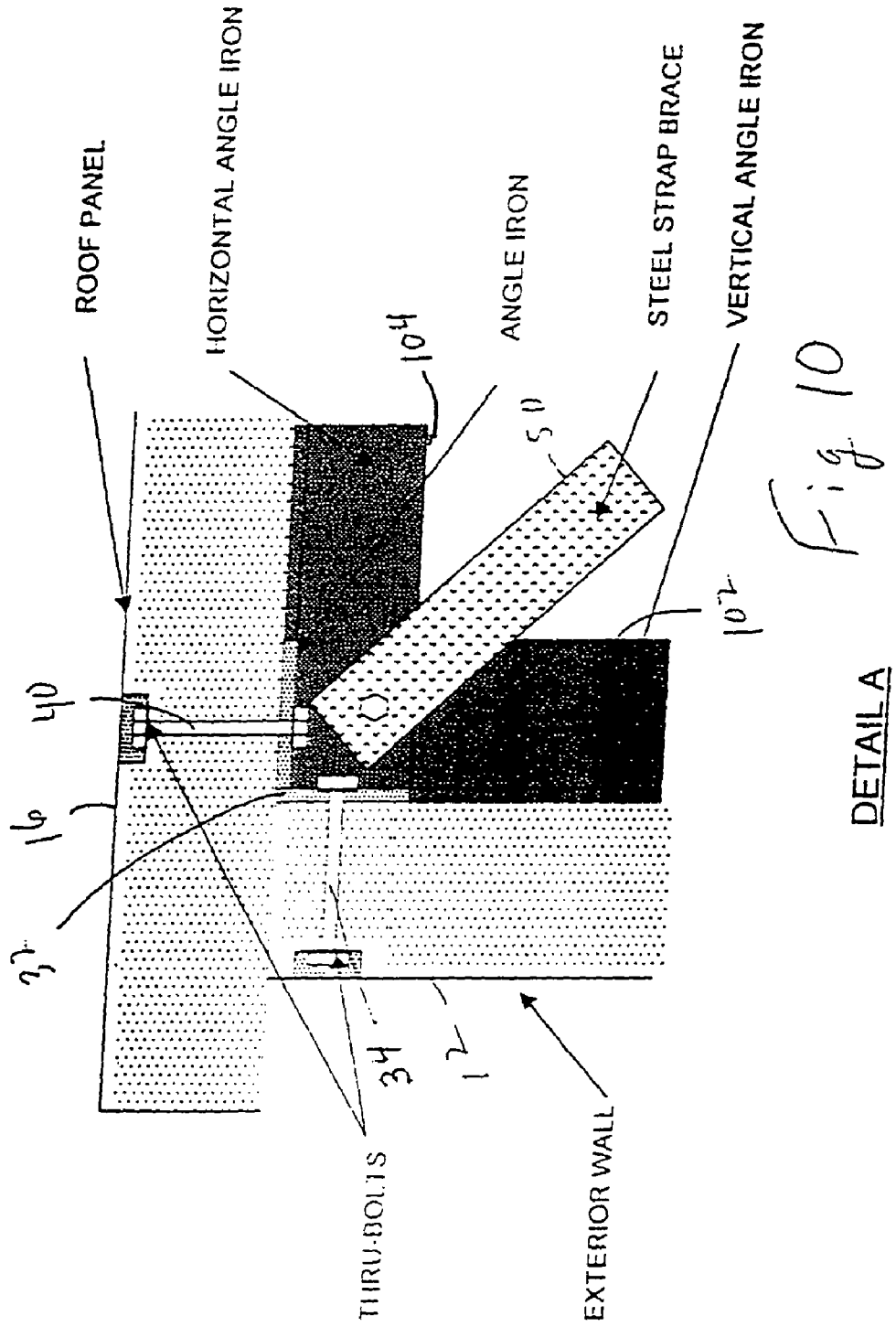
FIG. 10 is a detailed view of the fastening between the roof panels and wall panels of the building of FIG. 9.
Figure 11:
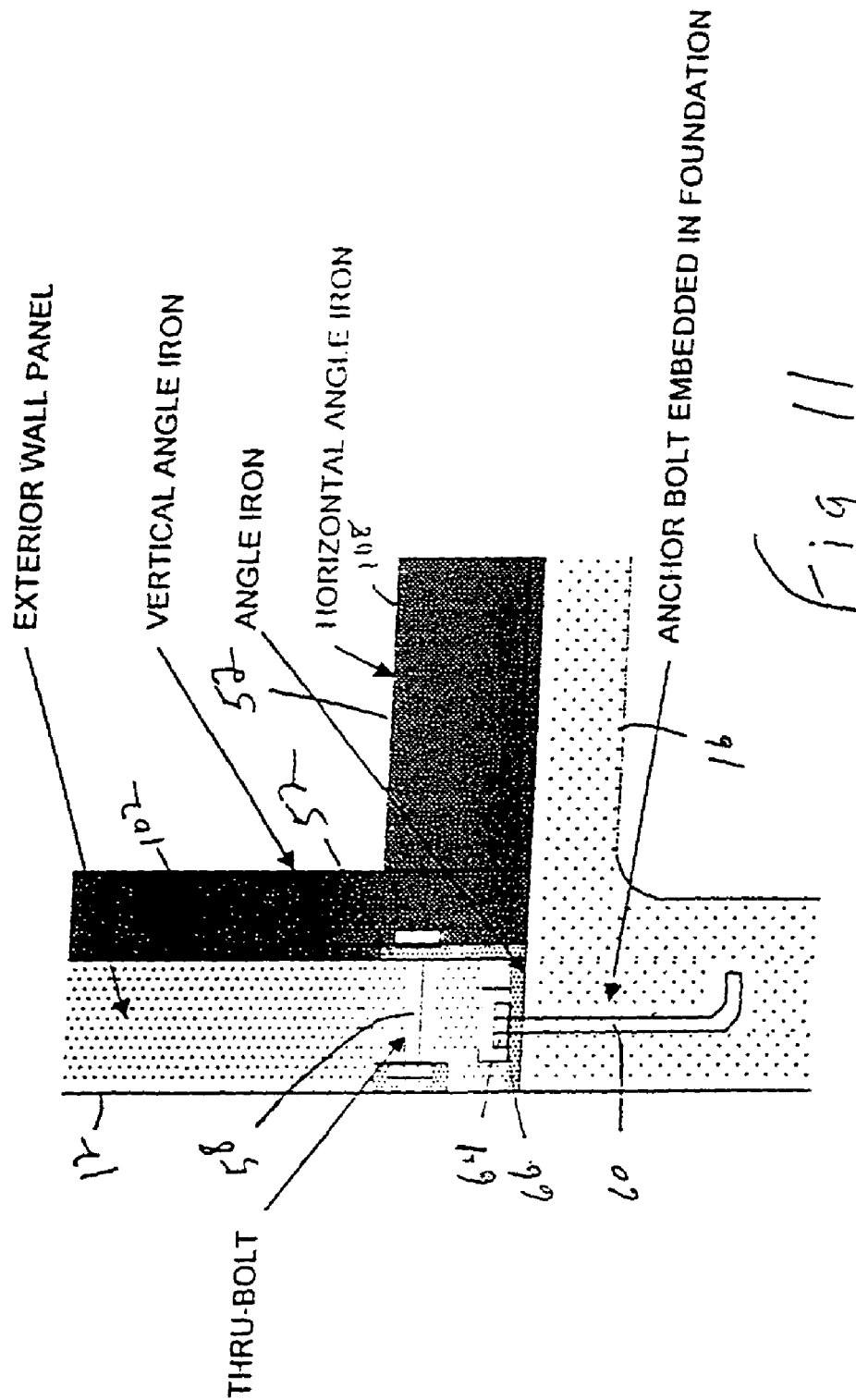
FIG. 11 is a detailed view of the attachment between the wall panel and the floor panel of the building of FIG. 9.

With reference now to the drawings, a building 10 capable of resisting 300 mile per hour winds is disclosed. With reference to FIGS. 2 and 3, the building 10 can be seen to include a plurality of vertical wall panels 12 (such as wall panels 12A-12G as seen in FIG. 6), roof panels 14 and floor and foundation panels 16. Each of the panels 12, 14 and 16 is preferably formed of autoclaved aerated concrete (sometimes referred to as autoclave cellular concrete), preferably containing internal reinforcing bar for strength. Typically, the panels would be ten inches thick, although eight inch thick panels would also be acceptable.

With reference to FIGS. 1, 4 and 5, the panels can be seen to be secured together by a plurality of angle irons or steel strip 18 bolted between abutting panels with bolts secured directly through the panels themselves. For example, in FIG. 1, a connection between a wall panel 12 and floor panel 16 is seen. The angle iron 18 extends along the entire width of the wall panel 12, preferably in a continuous manner along the entire wall of the building itself. A wall bolt 20 is placed through a pre-drilled hole 22 in the wall panel and hole 24 through the angle iron and bolts the angle iron to the wall panel 12. A similar floor bolt 26 passes through hole 28 formed in the floor panel 16 and hole 30 in the angle iron to bolt the angle iron to the floor panel.

With reference to FIG. 4, the attachment between a wall panel 12 and roof panel 14 is illustrated. A bent steel plate 32 is bent at an angle corresponding to the angle of the roof line relative to the wall. A wall bolt 34 passes through hole 36 in the wall panel 12 and hole 38 in the bent steel plate 32 to secure the bent steel plate to the side wall. A roof bolt 40 passes through a hole 42 in the roof panel and hole 44 in the bent steel plate to secure the roof panel to the bent steel plate and wall panel. It will be noted that the exterior surface of both the wall panel 12 and roof panel 14 are countersunk at 46 so that the head of the bolts 34 and 40 are recessed within the outer surface of the panels. Grouting 48 or similar fill material can fill the countersunk portion of the panels to enclose the bolt for weatherproofing and to provide a smooth exterior surface for final surface treatment.

The bolts are preferably one-half inch, three-quarter inch or one inch in diameter. The angle iron or steel strapping is preferably one-quarter inch thick, three-eighths inch thick, one-half inch thick or three-quarter inch thick. The reinforcing bar within the panels is preferably from one-quarter inch in diameter up to three-quarter inch in diameter. Exterior panels should have two rows of reinforcing bar while interior panels can have just one row of reinforcing bar. If desired, the panels can be glued to each other by high strength adhesive suitable for adhering to autoclaved aerated concrete, such as Hebel Dünnbettmörtel Type 10, sold by Hebel, a German company of Munich, Germany with offices at 2305 Six Branches Drive, Roswell, Ga., or similar adhesive as sold by Siporex, a Swedish company of Malmo, Sweden, or Hebel. Such an adhesive would not be used in a building that would be expected to be disassembled or temporary. While many dimensions of panels are suitable, 24-inch wide panels would be preferable.

The building 10, constructed in accordance with the teachings provided herein, is capable of withstanding sustained 300 mile per hour winds. Thus, it can withstand a hurricane force 5 wind and the maximum sustained wind of the most severe tornado. Preferably, the angle iron or steel strapping runs the full length of the building to provide enhanced strength.

It is possible also to replace the panels with blocks. The fastening of the blocks to the angle iron or steel strapping would be done in a similar manner to that disclosed above. Also, steel strap bracing 50 can be used diagonally throughout the building, as seen in FIG. 2, to enhance strength.

FIG. 5 illustrates an alternative attachment of a wall panel 12 to a floor and foundation panel 16. In this attachment, a bent steel plate 52 is bent and fit around beneath the wall panel and along the inside lower surface of the wall panel. A hole 54 is formed through the wall panel and a hole 56 is formed through the bent steel plate to receive a wall bolt 58 to hold the wall panel to the bent steel plate. An anchor bolt 60 is imbedded within the floor and foundation panel 16 and extends upwardly through the top surface thereof. A hole 62 is formed in the bent steel plate so that the plate can be bolted to the floor and foundation panel 16 as illustrated with nut 64 and washer 66.

A number of factors can be varied to adapt the building to various wind resistive degrees. These factors include the thickness of the panels or blocks used and the size of the rebar inside the panels or blocks. The spacing of the rebar inside the panels or blocks is also a variable. The thickness of the through bolts and the thickness of the angle iron steel strapping or bent steel plate is a variable. The vertical and horizontal length of the angle iron or bent steel plate is a variable. This includes the distance up the panels or blocks that the angle iron or bent steel plate reaches and the distance along the foundation or subfloor. The distance along the panels or blocks where the angle iron or bent steel plate is attached is a function. For example, it may attach at the corners only or partway above the floor or ceiling or roof or completely along the floor or ceiling or roof. Another factor is the distance between through bolts, the thickness of the braces or bracing and the number and placement of the braces or bracing. In addition, the use of adhesive between the panels or blocks is a factor. Finally, the strength of the adhesive used between the panels and blocks is a factor.

Autoclaved aerated concrete is available from a number of manufacturers. For example, this type of concrete is sold under the trademark Siporex. Autoclaved aerated concrete is a structural material of steam cured cellular or aerated concrete. It is manufactured by a closely controlled factory process from inexpensive, commonly available raw materials including cement, sand and water with aluminum powder added. The cement and sand can be replaced entirely or in part by lime, slag or flyash. After being ground and mixed with water, the slurry is poured into molds where a controlled chemical action takes place. Hydrogen gas is liberated, causing the mass to expand and forming evenly distributed closed spherical cells that give the concrete its unique physical properties. When the mass starts to harden, it is wire cut to close tolerances into slabs or blocks. These slabs or blocks are then steam cured under high pressure in autoclaves, completing the chemical process and insuring a stable, inert product ready for use. The material has the advantages of lightweight, high strength, high thermal insulation, good frost resistance, close tolerances and dimensional stability, the fire resistance of stone and the workability of wood. Typically, the density is less than one quarter of normal concrete.

For example, Contec of 12087 Starcrest Blossom Business Park, San Antonio, Tex. 78247 manufactures autoclaved aerated concrete in both block and panel shapes. For example, Contec manufactures blocks with a length of 24 inches and a height of 8 inches and widths of 4, 5, 6, 7, 8, 10 and 12 inches. Blocks are made with compressive strength of 355 psi and modulus of elasticity of 213,000 psi or compressive strength of 710 psi and modulus of elasticity of 355,000 psi. Contec also manufactures panels of length up to 20 feet, width 24 inches and thicknesses of 4, 5, 6, 7, 8, 10, and 12 inches. Panels are also made in two grades, with the first having compressive strength of 355 psi and modulus of elasticity of 213,000 psi and the second having compressive strength of 710 psi and modulus of elasticity of 355,000 psi.

With reference now to FIGS. 6-8, a modification of the present invention will be described which is incorporated in a building 100. Many elements of the building 100 are identical to elements in building 10 and are indicated by the same reference numerals. Building 100, however, utilizes angle iron along the entire length of mating edges of the panels 12, 14 and 16. For example, as seen in FIGS. 6 and 7, vertical angle iron 102 is secured at each corner of the building 100 along the vertical mating edge of two wall panels 16 which abut to form the corner. Wall bolts 20 pass through aligned holes 38 in the angle iron 102 and holes 36 in the wall panels 16 at regular intervals along the length of the angle iron 102 to secure the angle iron 102 to the wall panels 16 to further increase the strength of the building 100. The upper end of the angle iron 102 can abut the bent steel plate 32 as seen in FIG. 7.

Similarly, roof angle irons 104 are secured between the roof panels 14 and wall panels 12 along their line of intersection (such as wall panels 12A, 12B, 12C, 12E, 12F and 12G). Roof bolts 40 pass through aligned holes 44 in the roof angle iron 104 and holes 42 in the roof panels 14 at regular intervals along the length of the roof angle iron 104 to secure roof angle iron 104 to the roof panels 14. Wall bolts 20 pass through aligned holes 38 in the angle iron 104 and holes 36 in the wall panels 16 at regular intervals along the length of the angle iron 104 to secure the angle iron 104 to the wall panels 16 as well. The lower end of the angle iron 104 can abut the bent steel plate 32 as seen in FIG. 7.

The strap steel bracing 50 shown in FIG. 7 is bolted at its upper end shown to the wall panel 12A by wall bolts 20 passing through a hole 106 in the bracing 50 and a hole 36 in the wall panel 12A.

With reference to FIG. 8, the angle iron 102 can be seen to extend downward to the floor panel 16. A horizontal angle iron 108 extends along the mating edge of the wall panels 12 and the floor panel 16, which can form the bent steel plate 52 securing the wall panels 12 to the floor panel 16.

With reference now to FIGS. 9-15, a modification of the present invention will be described which is incorporated in a building 150. Many elements of the building 150 are identical to elements in building 10 and 100 and are indicated by the same reference numerals. Building 150 can either form a one story flat roof building or be a lower floor of a multistory structure. The roof panels 14 of building 150 could, for example, form the floor panels 16 of the next story on top of building 150.

Figure 12:
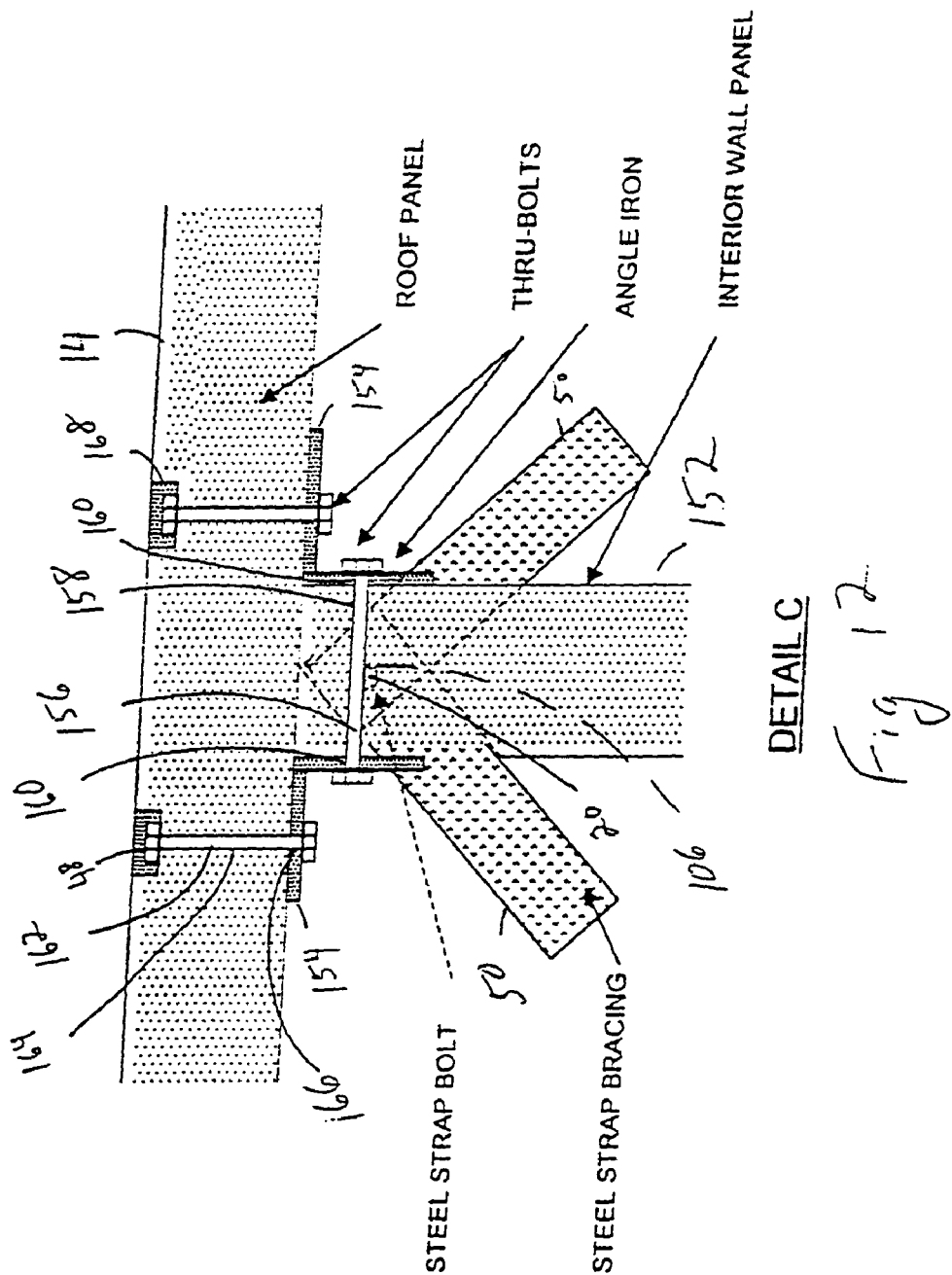
FIG. 12 is a detailed view of the attachment between the interior wall panel, roof panel, and steel strap bracing of the building of FIG. 9.

FIG. 12 illustrates the mating of an interior wall panel 152 of autoclaved aerated concrete with roof panel 14. Bent steel plates 154 are bent at right angles corresponding to the angle of intersection of the roof line relative to the interior wall panel 152. A wall bolt 156 passes through hole 158 in the wall panel 152 and holes 160 in the bent steel plate 154 to secure the bent steel plates to the wall panel 152. Roof bolts 162 pass through holes 164 in the roof panel and hole 166 in the bent steel plates 154 to secure the roof panel to the bent steel plates and wall panel 152. It will be noted that the exterior surface of roof panel 14 is countersunk at 168 so that the head of the bolts 162 are recessed within the outer surface of the panel. Grouting 48 or similar fill material can fill the countersunk portion of the panel to enclose the bolt for weatherproofing and to provide a smooth exterior surface for final surface treatment.

Figure 13:
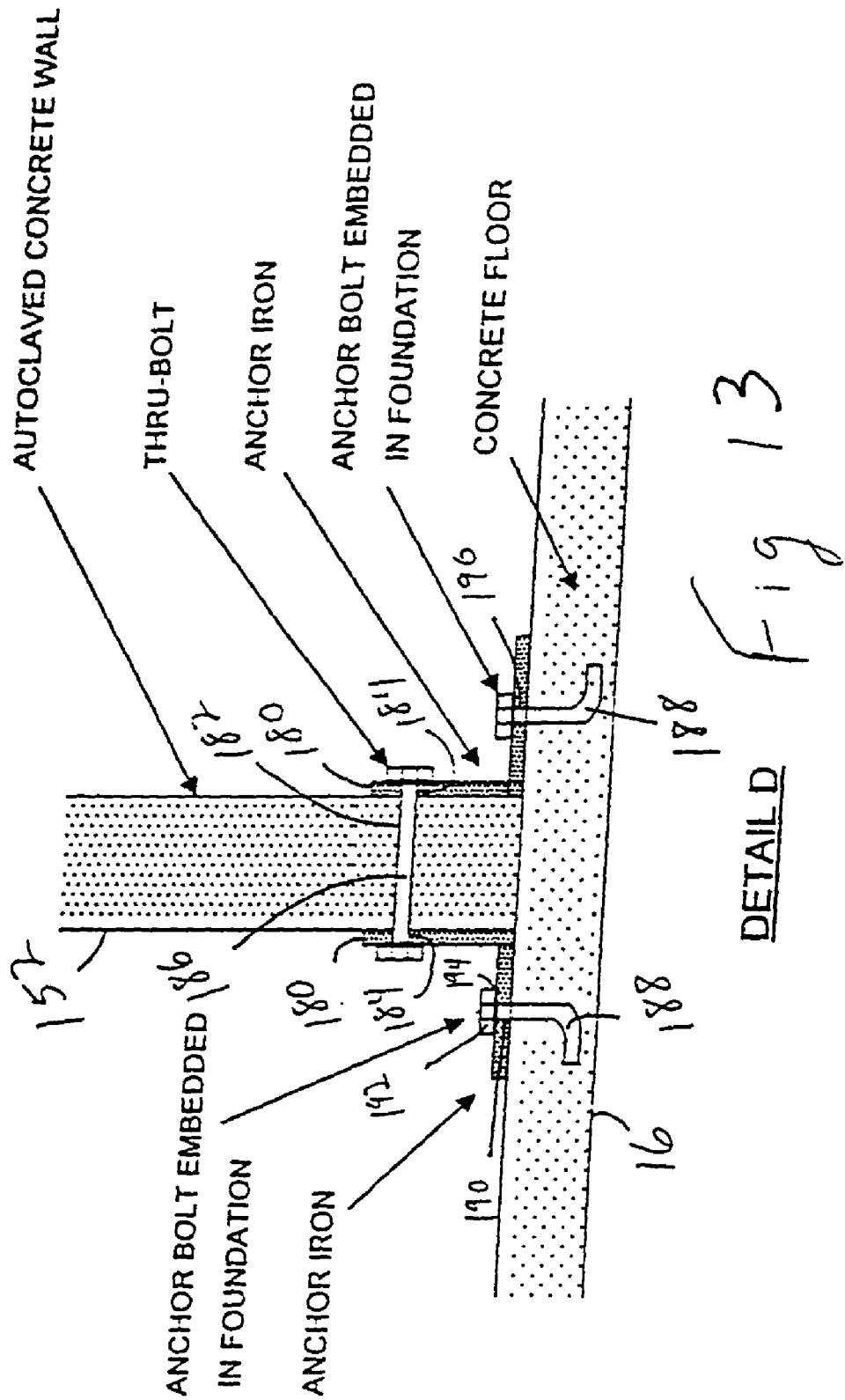
FIG. 13 is a detailed view of the attachment between the interior wall panel and floor panel of the building of FIG. 9.

FIG. 12 also illustrates the connection of strap steel bracings 50 shown in FIG. 13. Bracings 50 are bolted at their upper end shown to the wall panel 12 by a wall bolt 20 passing through aligned holes 106 in the bracing 50 and a hole 36 in the wall panel 12. The bracings 50 and bolt 20 lie between the interior wall panel 152 and mating wall panel 12, and the interior wall panel can be mortised to receive the bracings 50, and countersunk to receive the end of the bolt 20.

With reference now to FIG. 13, there is illustrated the connection between the interior wall panel 152 and the floor panel 16. In this attachment, bent steel plates 180 are bent at a right angle and placed along the inside lower surfaces of the wall panel 152, engaging the floor panel 16. A hole 182 is formed through the wall panel 152 and holes 184 are formed through the bent steel plate to receive a wall bolt 186 to hold the wall panel to the bent steel plates. Anchor bolts 188 are imbedded within the floor panel 16 and extend upwardly through the top surface thereof. Holes 190 are formed in the bent steel plates so that the plates can be bolted to the floor panel 16 as illustrated with nuts 192 and washers 194.

Figure 14:
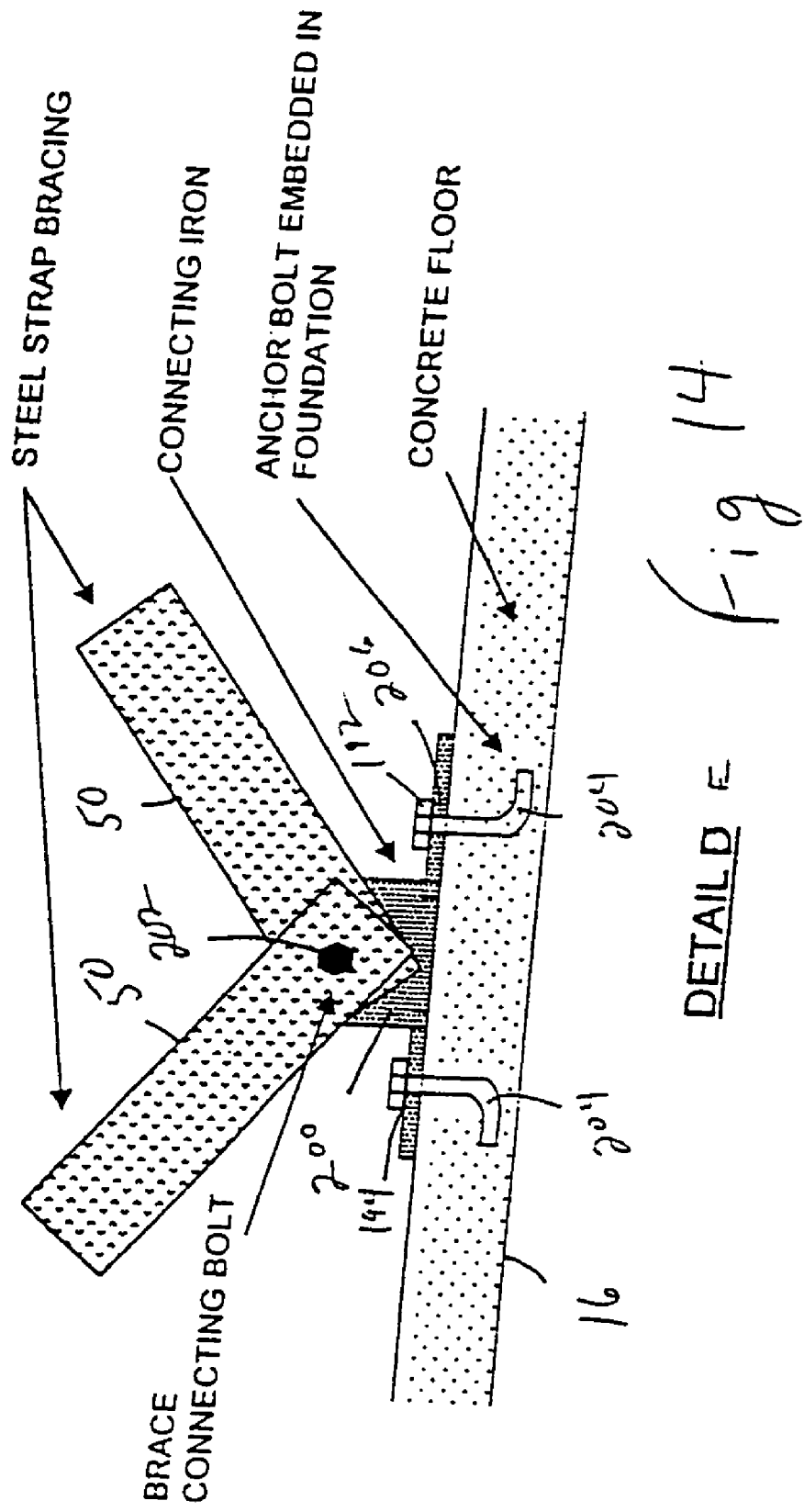
FIG. 14 is a detailed view of the attachment between the steel strap bracing and floor panel of the building of FIG. 9.
Figure 15:
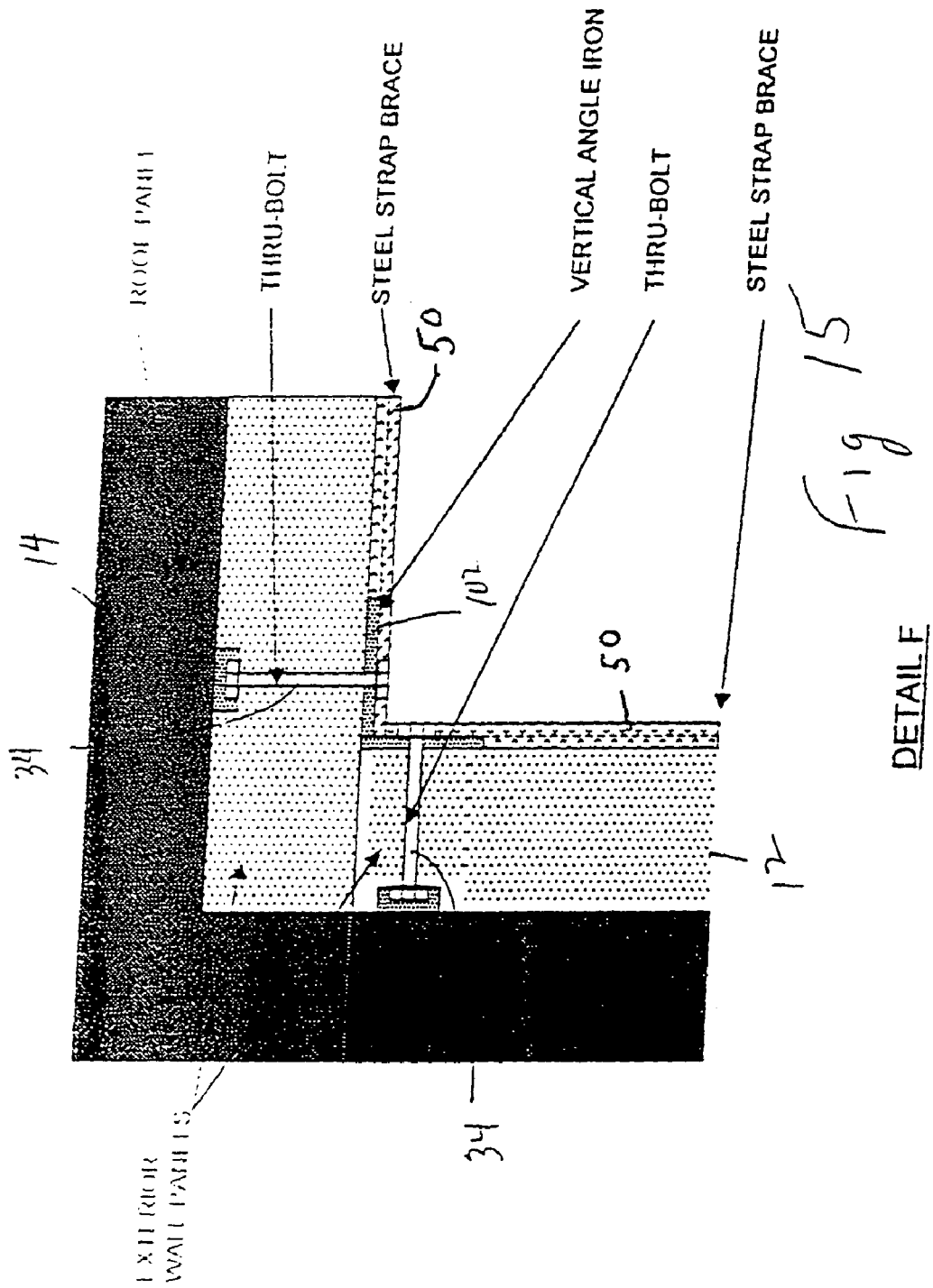
FIG. 15 is a horizontal cross section at the corner of the building of FIG. 9 taken along lines 15-15 in FIG. 9.

FIG. 14 illustrates the attachment of the steel strap bracing 50 to floor panel 16. A bracket 200 is formed with a hole aligned with holes in the lower ends of the steel strap bracing 50 to receive a bolt 202 to secure the bracing 50 to the bracket 200. Anchor bolts 204 are imbedded within the floor panel 16 and extend upwardly through the top surface thereof. Holes 206 are formed in the bracket 200 so that the bracket 200 can be bolted to the floor panel 16 as illustrated with nuts 192 and washers 194.

Figure 16:
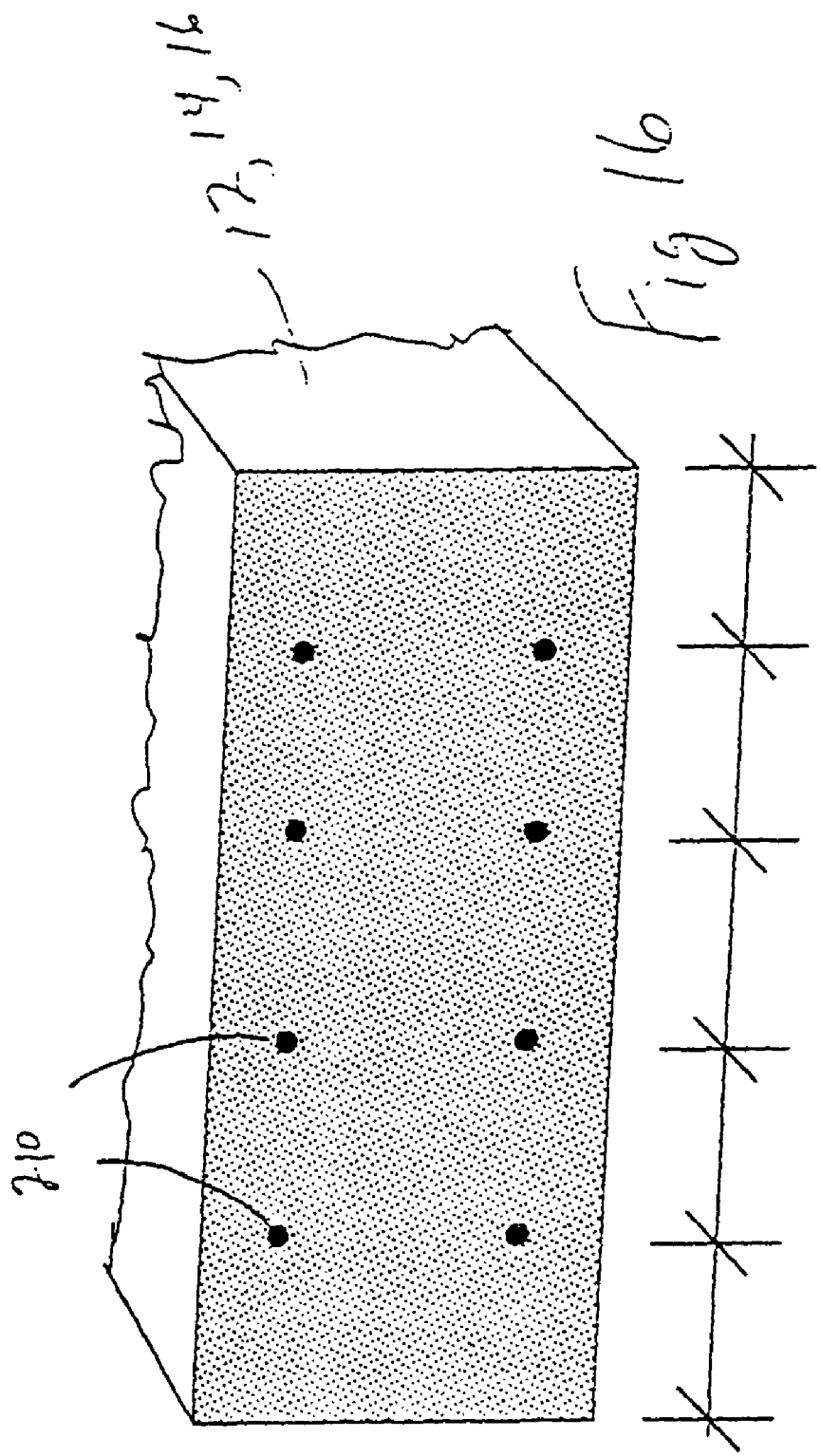
FIG. 16 is an illustrative cross section of a panel of autoclaved aerated concrete.

FIG. 16 illustrates the end of a panel or block of autoclaved aerated concrete showing typical placement of the reinforcing bars 210.

Three examples of construction of a building suitable to resist 300 mile per hour winds will be provided.

In the first example, autoclaved aerated concrete panels of 8 inch thickness are used. ⅜ inch diameter reinforcing bar was spaced every 2 inches in the panels. Bolts 26, 34, 40, 58, 60, 156, 162, 186, 188, 202 and 204 are ½ inch diameter and are grade 8 in strength. The angle iron 18, 32, 52, 102, 104, 108, 154 and 180 are 5/16 inch thick and each side of the angle is 4 inches wide and are standard A36. Angle iron extends along the entire length of mating roof, wall and floor panels. The distance between adjacent bolts in a common angle iron, ie adjacent bolts 26 in bent steel plate 32 or adjacent bolts 186 in the same bent steel plate 180, is 24 inches. The braces are ½ inch thick and 4 to 6 inches wide and have a tensile strength minimum of 60 Ksi. Two braces are provided per 20 feet of wall length. Adhesive can be used as desired, but is not required to meet the load requirements.

In the second example, autoclaved aerated concrete panels of 10 inch thickness are used. ½ inch diameter reinforcing bar was spaced every 4 inches in the panels. Bolts 26, 34, 40, 58, 60, 156, 162, 186, 188, 202 and 204 are ¾ inch diameter and are grade 8 in strength. The angle iron 18, 32, 52, 102, 104, 108, 154 and 180 are ⅜ inch thick and each side of the angle is 5 inches wide and are standard A36. Angle iron extends along the entire length of mating roof, wall and floor panels. The distance between adjacent bolts in a common angle iron, ie adjacent bolts 26 in bent steel plate 32 or adjacent bolts 186 in the same bent steel plate 180, is 24 inches. The braces are ¾ inch thick and 4 to 6 inches wide and have a tensile strength minimum of 60 Ksi. Two braces are provided per 20 feet of wall length. Adhesive can be used as desired, but is not required to meet the load requirements.

In the third example, autoclaved aerated concrete panels of 12 inch thickness are used. ¾ inch diameter reinforcing bar was spaced every 6 inches in the panels. Bolts 26, 34, 40, 58, 60, 156, 162, 186, 188, 202 and 204 are 1 inch diameter and are grade 8 in strength. The angle iron 18, 32, 52, 102, 104, 108, 154 and 180 are ½-¾ inch thick and each side of the angle is 6 inches wide and are standard A36. Angle iron extends along the entire length of mating roof, wall and floor panels. The distance between adjacent bolts in a common angle iron, ie adjacent bolts 26 in bent steel plate 32 or adjacent bolts 186 in the same bent steel plate 180, is 24 inches. The braces are 1 inch thick and 4 to 6 inches wide and have a tensile strength minimum of 60 Ksi. Two braces are provided per 20 feet of wall length. Adhesive can be used as desired, but is not required to meet the load requirements.

The following comments relate to U.S. Pat. Nos. 3,706,168 to Pilish; 6,298,619B1 To William Davie; and 5,286,427A to George Koumal.

Pilish discloses in his patent a prefabricated concrete building and a method of construction for this building. However, his disclosure does not provide any specific information such as dimensions, sizes, or strength characteristics of material used for the construction of the disclosed building. This information would include the following:

i. Precast wall and roof forming panel dimensions
    ii. Overall building structure dimensions
    iii. Spacing of disclosed precast footings
    iv. Material specifications and dimensions of studs and anchor bolts used to interconnect the roof panels and wall panels together The absence of documentation regarding the items listed above prevents a person interested in constructing a building, using the disclosed method, from determining the wind resistive capabilities of such a structure.

Davie's disclosure presents a modular building frame system and a method of construction for such a system. He also discloses that his building can withstand wind speeds of up to 110 miles per hour. However, there is no mention in his disclosure of specific information such as dimension, size, or strength characteristics of material used for the construction of the disclosed building. Such required information includes the following:

i. Overall building structure dimensions
    ii. Material specifications and dimensions for bolts, hinges, and intergaging flanges used for the disclosed building construction
    iii. Material specifications and dimensions for base plates and concrete pad mounting elements The wind resistive capabilities of the building disclosed by Davies cannot be determined in the absence of the information listed above.

Koumal's patent disclosure presents a method/process of environmental cleanup by production of autoclaved aerated building material (AAC) using mine tailings waste material. The disclosure indicates that the resulting product can be used for the production of structural building products, such as panels, that can be used for building construction. The patent does not disclose, however, information as to the method of building or building systems construction. As a consequence, no disclosures have been presented by Koumal as to the wind resistive characteristics of buildings that may be constructed with AAC material manufactured using his disclosed process.

The information presented by each of the three patent holders for each of the three patent disclosures is not sufficient to determine the wind resistive characteristics of building structures constructed using the disclosed materials and methods. This is true whether the information disclosed by each of the three patents is used individually from each disclosure or whether the information is obtained from all the three patent disclosures combined. Furthermore, no economic value can be estimated for the construction of each of the disclosed buildings from the information disclosed by these patents.

Although a single embodiment of the present invention has been illustrated in the accompanying drawings and described in the foregoing detailed description, it will be understood that the invention is not limited to the embodiment disclosed, but is capable of numerous rearrangements, modifications and substitutions of parts and elements without departing from the scope and spirit of the invention.

I claim:

1. A method for constructing a building capable of resisting 300 mph winds, comprising the steps of:

selecting the thickness of autoclaved cellular concrete panels to form the exterior walls, floor and roof of the building and the size and number of reinforcing bars within the panels, each panel having an interior surface and each panel being initially unconnected to the other panels;

selecting the sizes and strength of angle iron or bent steel plate to bolt the panels together;

selecting the size and strength of strap bracing to bolt the panels together;

selecting the diameter and strength of bolts to bolt the panels together to form the building using the angle iron or bent steel plate and strap bracing; and bolting the panels together with the angle iron or bent steel plate, strap bracing and bolts to form the building, the bolts passing through the entire thickness of the panels through bolt holes in the panels and the angle iron or bent steel contacting only the interior surfaces of the panels, the strap bracing secured between non-adjacent panels so that the strap bracing spans at least one panel therebetween, none of the angle iron or bent steel plate or strap bracing being imbedded in the panels, the bolt holes being the only penetration of the panels to secure the angle iron or bent steel and strap bracing to the panels, adjacent panels being glued to each other by a high strength adhesive, the panels carrying the entire load on the building with the building having no other framing and capable of resisting 300 mph winds.

2. A building capable of withstanding 300 mile per hour winds, comprising:

a plurality of panels of autoclaved aerated concrete forming the walls, roof and floor of the building, the panels having an interior surface and each panel being initially unconnected to the other panels;

a plurality of angle iron sections or bent steel plates;

a plurality of strap bracing;

a plurality of bolts securing the angle iron sections or bent steel plates and strap bracing and the panels together to form the walls, roof and floor of the building, each bolt passing through the panel in which it is secured through bolt holes in the panels, the angle iron or bent steel and strap bracing contacting only the interior surfaces of the panels, the strap bracing secured between non-adjacent panels so that the strap bracing spans at least one panel therebetween, the bolt holes being the only penetration of the panels to secure the angle iron or bent steel and strap bracing to the panels, adjacent panels being glued to each other by a high strength adhesive, none of the iron sections or bent steel plate and strap bracing being imbedded in the panels, the panels carrying the entire load on the building with the building having no other framing and capable of resisting 300 mph winds.

3. The building of claim 2 wherein at least one angle iron section or bent steel plate is bolted directly to a wall panel and a roof panel.

4. The building of claim 2 wherein at least one angle iron section or bent steel plate is bolted directly to a wall panel and a floor panel.

5. The building of claim 2 wherein at least one brace is bolted between two of said wall panels, said brace bolted directly to the wall panels and spanning at least two intervening wall panels.

6. The building of claim 2 wherein said panels each have an exterior surface, the exterior surface being countersunk to receive the head of a bolt or a nut, the building further having grouting to fill the countersink.

7. The building of claim 2 wherein at least one floor panel has an anchor bolt imbedded therein, at least one of said angle iron sections or bent steel plates fit around beneath a wall panel and along the inside lower surface of said wall panel.

8. The building of claim 2 wherein the building has a width, at least one of the angle iron sections or bent steel plates extending continuously the entire width of the building.

9. The building of claim 2 wherein the building has a height, at least one of the angle iron sections or bent steel plates extending continuously the entire height of the building.

10. The building of claim 2 wherein the panels each have reinforcing bar therein, the reinforcing bar being ¼ to ¾ inch in diameter and spaced 2, 4 or 6 inches apart from adjacent reinforcing bar.

11. The building of claim 2 wherein the panels are 8, 10 or 12 inches thick.

12. The building of claim 2 wherein the angle iron sections or bent steel plates are ¼, ⁵⁄₁₅, ⅜, ½, or ¾ inch thick and 4 or 5 inches wide.

13. The building of claim 2 wherein the building has a roof angle, the angle iron sections or bent steel plates between wall and roof panels are bent at the angle of the roof.

14. The building of claim 2 wherein the panels form the exterior and interior walls of the building.

15. A building capable of withstanding 300 mile per hour winds, comprising:
- a plurality of panels of autoclaved aerated concrete forming the walls, roof and floor of the building, the panels having an interior surface and each panel being initially unconnected to the other panels;
- a plurality of angle iron sections or bent steel plates;
- a plurality of bolts securing the angle iron sections and the panels together to form the walls, roof and floor of the building, each bolt passing through the panel in which it is secured through bolt holes in the panels, the panels carrying the entire load on the building with the building having no other framing, at least one angle iron section or bent steel plate being bolted directly to a wall panel and a roof panel and at least one angle iron section or bent steel plate being bolted directly to a wall panel and a floor panel;
- at least one brace is bolted between two of said wall panels;
- said panels each having an exterior surface, the exterior surface being countersunk to receive the head of a bolt or a nut, the building further having grouting to fill the countersink, the building having a width, at least one of the angle iron sections or bent steel plates extending continuously the entire width of the building and the building having a height, at least one of the angle iron sections or bent steel plates extending continuously the entire height of the building;
- the angle iron or bent steel and strap bracing contacting only the interior surfaces of the panels, the strap bracing secured between non-adjacent wall panels so that the strap bracing spans at least one wall panel therebetween, adjacent panels being glued to each other by a high strength adhesive, none of the iron sections or bent steel plate and strap bracing being imbedded in the panels, the bolt holes being the only penetration of the panels to secure the angle iron or bent steel and strap bracing to the panels;
- wherein the panels each have reinforcing bar therein, the reinforcing bar being ¼ to ¾ inch in diameter and spaced 2, 4 or 6 inches apart from adjacent reinforcing bar, the panels being 8, 10 or 12 inches thick and the angle iron sections or bent steel plates are ¼, ⁵⁄₁₅, ⅜, ½, or ¾ inch thick and 4 or 5 inches wide, the building having a roof angle, the angle iron sections or bent steel plates between wall and roof panels being bent at the angle of the roof.

16. The building of claim 2 wherein the roof of the building is sloped, the wall panels having different lengths to extend continuously from the floor panels to the roof panels as the roof slopes.

\* \* \* \* \*